(12) United States Patent
Petriella et al.

(10) Patent No.: US 12,411,033 B2
(45) Date of Patent: Sep. 9, 2025

(54) SYSTEM AND METHOD FOR MEASURING SOLID OBJECTS FLOW RATE

(71) Applicant: YPF TECNOLOGÍA S.A., Ciudad Autónoma de Buenos Aires (AR)

(72) Inventors: Marco Petriella, Ciudad Autónoma de Buenos Aires (AR); Yago Cagnacci, Ciudad Autónoma de Buenos Aires (AR)

(73) Assignee: YPF TECNOLOGÍA S.A., Ciudad Autónoma de Buenos Aires (AR)

( * ) Notice: Subject to any disclaimer, the term of this patent is extended or adjusted under 35 U.S.C. 154(b) by 72 days.

(21) Appl. No.: 18/404,372

(22) Filed: Jan. 4, 2024

(65) Prior Publication Data

US 2024/0230387 A1 Jul. 11, 2024

Related U.S. Application Data

(60) Provisional application No. 63/437,194, filed on Jan. 5, 2023.

(51) Int. Cl.
G01F 1/74 (2006.01)
H04N 23/74 (2023.01)

(52) U.S. Cl.
CPC ............. *G01F 1/74* (2013.01); *H04N 23/74* (2023.01)

(58) Field of Classification Search
CPC .................................. G01F 1/74; H04N 23/74
USPC ......................................................... 348/135
See application file for complete search history.

(56) References Cited

U.S. PATENT DOCUMENTS

| | | | |
|---|---|---|---|
| 2014/0333754 A1 | 11/2014 | Graves et al. | |
| 2017/0016833 A1* | 1/2017 | Huibregtse | G01N 21/9036 |
| 2017/0089153 A1 | 3/2017 | Teodorescu | |
| 2017/0138168 A1* | 5/2017 | Hardeman | G01F 1/76 |
| 2020/0149394 A1* | 5/2020 | Hao | E21B 7/04 |
| 2022/0018241 A1* | 1/2022 | Affleck | G06F 18/24 |

* cited by examiner

*Primary Examiner* — Allen C Wong
(74) *Attorney, Agent, or Firm* — MUNCY, GEISSLER, OLDS & LOWE, P.C.

(57) ABSTRACT

A system for measuring cuttings flow rate comprising a surface, a laser line generator, a high-resolution camera, a data processing unit, wherein the data processing unit is configured for acquiring a laser line position data as a function of time from a plurality of photographs taken by the high-resolution camera and calculating a cuttings size from the laser line position data as a function of time, a method for calculating cuttings flow rate and for detecting cavings during an oil drilling operation.

13 Claims, 16 Drawing Sheets

(a)

(b)

SYSTEM AND METHOD FOR MEASURING SOLID OBJECTS FLOW RATE

TECHNICAL FIELD

The present invention generally relates to the field of oil drilling operations. Specifically, the present invention relates to systems and methods for measuring the flow rate of solid fragments generated in a wellbore during oil drilling operations.

BACKGROUND

Drill cuttings are frequently defined as broken bits of solid materials, produced as rock is being broken by a drill bit advancing through the rock or soil during oil drilling operations. If cuttings are not adequately removed from a wellbore, they may hamper or impede the operation. For this reason, the transport of cuttings from the bit up the annulus to the surface must be carried out, generally by using a drilling fluid or drilling mud.

The deficit of cuttings with respect to their expected theoretical amount considering the bottom hole assembly (BHA) perforation rate may be indicative of cutting accumulation at the bottom of the wellbore or at its walls, which may negatively impact the rate of perforation (ROP) or cause an increase in non-productive time (NPT). Examples of issues caused by cutting accumulation include stuck pipes, premature core bit wear, decrease in ROP, formation fracture, excessive torque in drilling rod as well as difficulties during casing installation and cementation. Early detection of cutting deficit at the surface allows carrying out wellbore cleaning operations in order to avoid these types of issues.

On the other hand, the presence of cavings, i.e., rock fragments larger than the cuttings and frequently generated by detachment of well walls, is indicative of possible instabilities that may interfere with the success of the drilling operation if no corrective measures are taken, e.g., changes in the drilling mud rheological properties and/or density. Early detection of cavings and their classification by form and size is therefore highly desirable.

According to the state of the art, measurement of these solid fragments flow rate is carried out manually by field operators by placing a collecting tray at the outlet of the discharge ramp and measuring the time required for the tray to be filled to a certain degree. Disadvantageously, this method requires that the operators monitor these flow rates for the duration of the drilling operation.

Patent Application No. US2017/089153 disclosed a system comprising a camera and equipment to measure cutting density and size, in order to optimize the operation of the shakers (i.e. slope, frequency, intensity, mesh size, etc.) and to verify that cuttings are not accumulating on the shakers.

Patent Application No. US2014/333754 discloses a system for measuring the size, volume and shape of cuttings by using a camera.

The prior art does not disclose methods to measure the cutting flow rate, and is silent regarding methods to detect cavings or larger rock fragments during a drilling operation.

There is therefore a need to provide a system and a method to automate cuttings flow rate measurements during a drilling operation and that further enables the detection and reconstruction of cavings.

SUMMARY

The systems and methods provided by the invention can overcome the limitations described above. The system comprises a 3D optical scanner, which is installed on the cuttings discharge ramps, more specifically at the shaker outlets, and which allows the measurement of the volumetric flow of cuttings and an early detection of cavings by using real-time image processing. The presence of caving can be indicative of a landslide.

The 3D scanner works as a laser profilometer, using a laser line generator and a camera arranged at an angle, allowing the height of the objects that cross the line to be obtained. In addition, by using the camera, the system is capable of measuring the surface velocity of the fluid flowing down the ramp. By combining the profile and velocity measurements, it is possible to obtain a volumetric flow rate measurement and, at the same time, carry out the three-dimensional reconstruction of the objects, allowing 3D images to be obtained, which have an enhanced contrast with respect to images obtained by the systems and methods of the prior art, thereby increasing the efficiency in the early detection of cavings or landslides.

Therefore, in a first aspect, the invention provides a system comprising a surface for receiving solid objects, a laser line generator, a high-resolution camera arranged at an angle of about 10° to 20° with respect to the laser line generator—preferably of about 14°—a data processing unit, wherein the data processing unit is configured for acquiring a laser line position data as a function of time from a plurality of photographs of the solid objects taken by the high-resolution camera and calculating a solid object size from the laser line position data as a function of time.

In some embodiments, the system further comprises a hood for darkening a measurement area of the system.

In some embodiments, the system further comprises a flashlight for controlling lighting levels.

In embodiments, the system further comprises an optical filter.

In the system provided by the invention, the data processing unit is further configured for calculating a cuttings flow rate from the plurality of photographs of the solid objects taken by the high-resolution camera. In specific embodiments, the data processing unit is further configured for detecting cavings from the calculated solid object size.

In specific embodiments, system optical resolution is greater than the pixel size (dz), wherein $$dz = \frac{\text{pixel}_{pitch}}{M\sin(\alpha)}$$

wherein $\text{pixel}_{pitch}$ corresponds to the pixel size in the sensor, M is a high-resolution camera lens magnification and a is the angle with respect to the laser line generated by the laser line generator.

In embodiments, the system provided by the invention further comprises a shaker, wherein the solid surface forms a discharge surface for the solid objects into the shaker. Preferably, the shaker is uncoupled from the discharge surface.

In other embodiments, the high-resolution camera is placed at the discharge surface.

In a second aspect, the invention further provides a method for calculating a solid object flow rate from a mixture comprising an oil-based mud and solid objects, comprising:

providing a surface for receiving solid objects, a laser line generator, a high-resolution camera arranged at an angle of about 10° to 20° with respect to the laser line generator— preferably of about 14°—and a data processing unit; letting the mixture flow over the surface; taking a plurality of photographs of the solid objects with the high-resolution camera; acquiring, by the data processing unit, a laser line position data as a function of time from a plurality of photographs of the solid objects taken by the high-resolution camera and calculating a solid object size from the laser line position data as a function of time; and calculating a cuttings flow rate from the plurality of photographs of the solid objects taken by the high-resolution camera.

In a third aspect, the invention provides method for detecting cavings in an oil-drilling operation, comprising: providing a surface for receiving solid objects, a laser line generator, a high-resolution camera arranged at an angle of about 10° to 20° with respect to the laser line generated by the laser line generator—preferably of about 14°—and a data processing unit; letting a mixture comprising an oil-based mud and solid objects flow over the surface; taking a plurality of photographs of the solid objects with the high-resolution camera; acquiring, by the data processing unit, a laser line position data as a function of time from a plurality of photographs of the solid objects taken by the high-resolution camera and calculating a solid object size from the laser line position data as a function of time; and determining a presence of cavings from the solid object size, wherein a caving is an object having a size of about 10 mm or more.

DETAILED DESCRIPTION

The invention will be described in further detail below with reference to the appended figures, included only for illustrative purposes.

As used herein, the term "laser line generator" refers to devices, apparatuses, or systems comprising a laser beam generator and capable of producing a planar laser beam, i.e. "a laser line". Such devices, apparatuses, or systems are well known and readily available to one having ordinary skill in the art.

As used herein, a "shaker" is a vibrating screen or sieve. Typically, during a well drilling operation, shakers strain cuttings out of the mud before the mud is pumped back down into the borehole. The shakers allow separating the liquid phase (e.g. an oil-based mud) from the solid phase (cuttings). The recovered mud is injected back into the mud circuit used during the drilling operation and the cuttings are accumulated in containers located at the shaker outlet.

As used herein, the term "cavings" refers to rock fragments that are detached from the borehole wall, and indicate possible geomechanical instability, as well as a risk of landslides. Cavings are generally larger than cuttings and, as opposed to cuttings, are not generated by the action of the drill bit on the rock in the borehole. While cutting typically have sized in the order of magnitude of 1 μm-1 mm, cuttings have greater sizes in the order of magnitude of 1 mm-1 cm.

The present invention provides a system comprising a 3D scanner allowing the tridimensional reconstruction of solid objects or fragments thereof based on laser profilometry.

Figure 1:
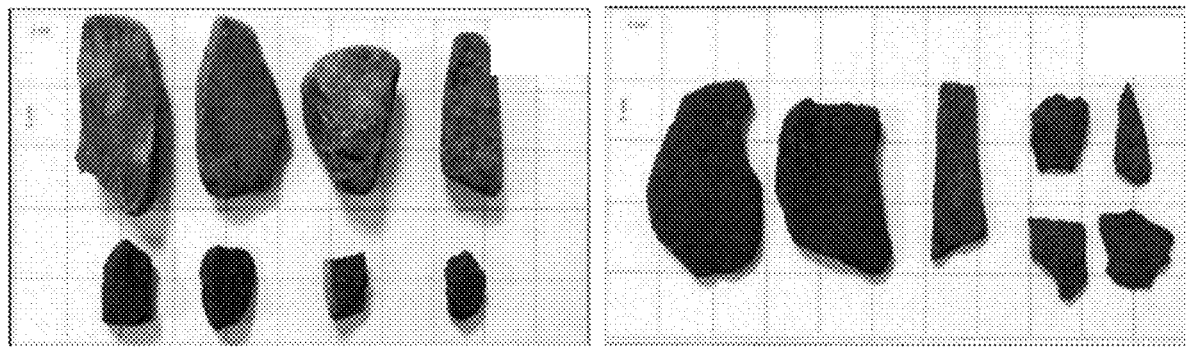
FIG. 1 shows cavings of the block and tubular types recovered during an oil drilling operation in Vaca Muerta, province of Neuquén, Argentina.
Figure 2:
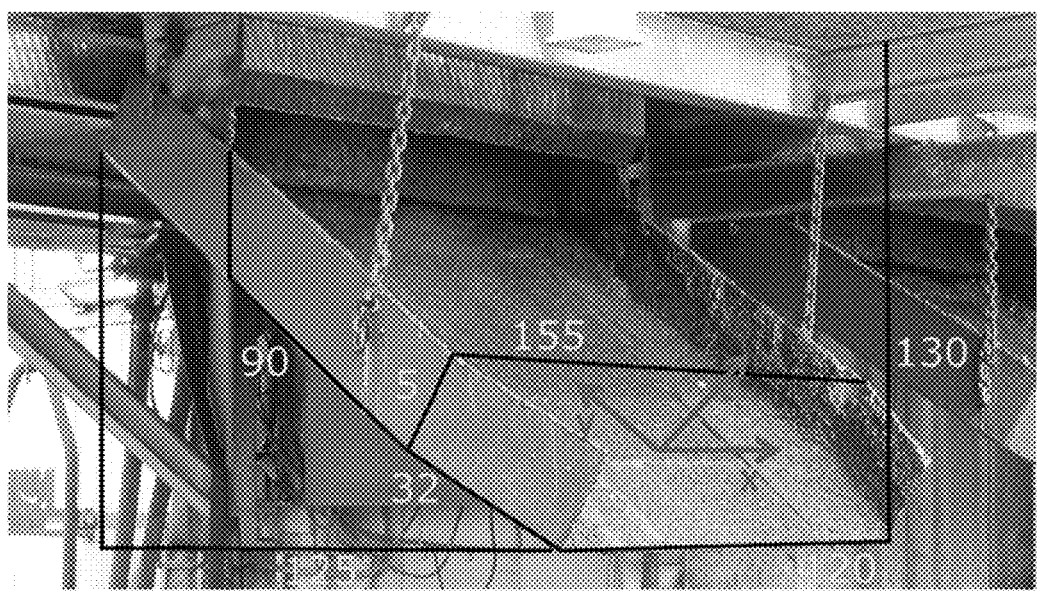
FIG. 2 shows a typical cuttings discharge rate and typical dimensions in cm.

Solid objects which can be detected using the system provided by the invention include rock and rock fragments, such as cuttings or cavings, as seen for example in FIG. 1. FIG. 2 shows a typical cuttings discharge ramp as can be found in a surface installation at an oil production facility, wherein the system provided by the invention can be implemented.

Figure 3:
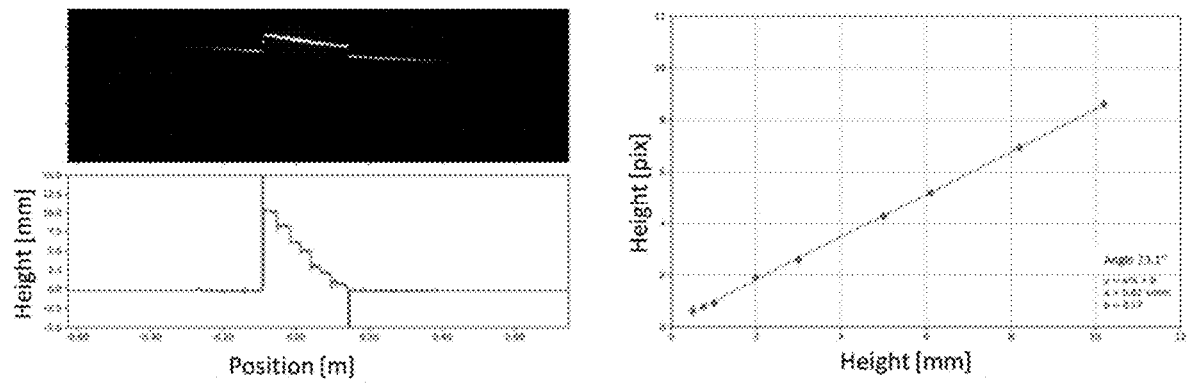
FIG. 3 shows an optical image and a reconstruction of a cutting profile (left) and the calibration curve for height in the 3D scanner (right).

As they cross the laser line, the solid objects modify the position of the laser line in the resulting image, and by measuring the displacement, which is proportional to the height of the object, a reconstruction of the object can be carried out. FIG. 3 shows the calibration curve obtained, for relating a reconstructed object height to a pixel height, as detected by the high-resolution camera. In order to improve the resolution, a profile correlation algorithm is proposed, which allows to increase the resolution to a value above the theoretical value imposed by the pixel size (dz), $$dz = \frac{\text{pixel}_{pitch}}{M\sin(\alpha)}$$

wherein $\text{pixel}_{pitch}$ corresponds to the pixel size in the sensor, M is the lens magnification and a is the angle formed by the laser and the camera. From the expression above, it is observed that, at a greater angle, dz becomes smaller, thus increasing the resolution. However, it is desirable that the angle α be small, so that the system is more compact. The proposed algorithm performs a cross-correlation of the measured profile using a gaussian curve of which the centroid is obtained. In this manner, a more precise measurement of the line position is obtained, with respect to considering the greatest intensity pixel, which is also limited by pixel size.

Figure 4:
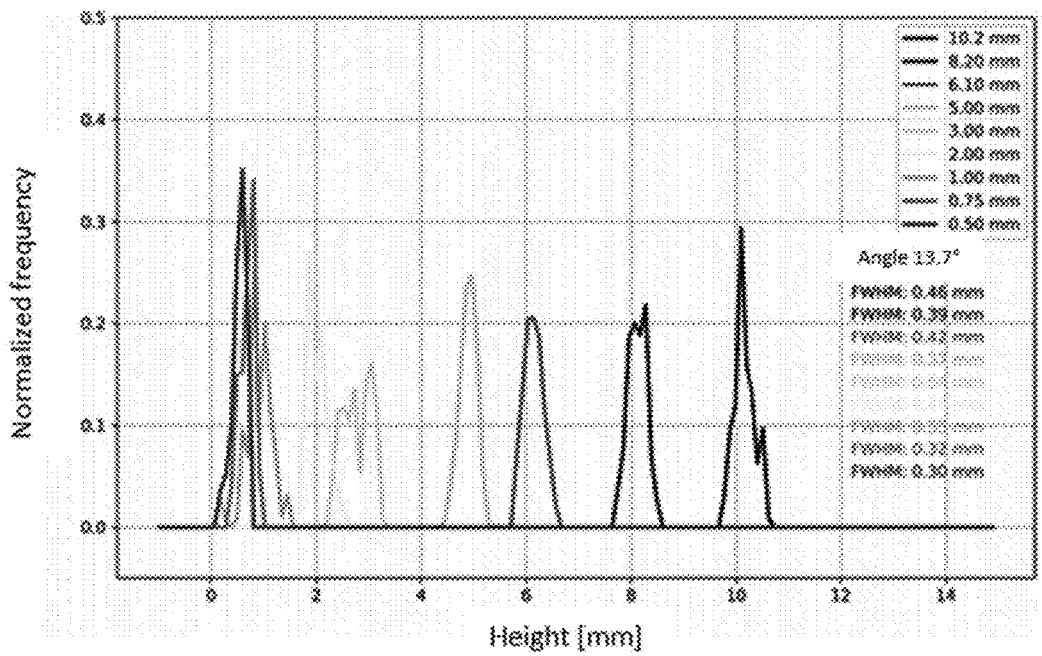
FIG. 4 shows the resolution curves obtained during the calibration process.

In FIG. 4, histograms for the line detection are shown for objects used in the calibration of FIG. 3. As can be seen, the obtained resolution if of 0.45 mm, defined as the full width at half maximum (FWHM), is four times lower than the pixel size of 1.85 mm. In this manner, it is possible to increase the system resolution by a factor of 4, thereby reducing the camera/laser angle without compromising the resolution.

Figure 5:
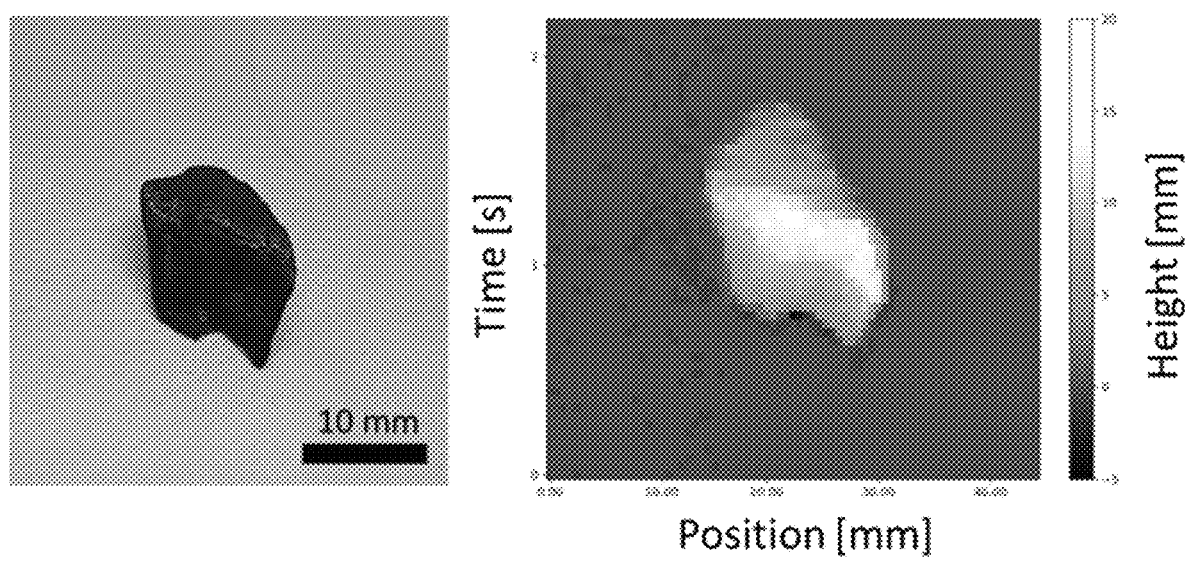
FIG. 5 shows a typical cutting (left) and the corresponding image obtained with the system and method provided by the invention.

Taking the above-mentioned aspects into account, a tridimensional reconstruction of objects can be achieved, such as the one shown in FIG. 5, corresponding to a model of a caving obtained from a sample taken from a field drilling operation.

A further aspect of the system and method provided by the invention is the ability to measure the surface velocity of the mud and cutting sample, by which the flow rate is determined. To this end, the scanner camera is used, thereby reducing the costs and equipment size. By employing an image comparison algorithm using a cross-correlation, similar to the algorithm used in Particle Image Velocimetry, the objects displacement can be determined frame by frame, and using the time elapsed between two consecutive frames, a measurement of the velocity can be obtained.

The method provided by the invention was found to be effective even using homogenous mud and cutting samples.

The algorithm used to obtain the velocity of a sample is described in further detail below.

The same ROI, typically of 200 pixels in height and 100 pixels in width, is considered for any two images for which the displacement is to be obtained. A mean filter is applied to the images by convoluting the image with a typical square kernel of 45 pixels and acting as a high-pass filter, which reduces the background levels for each image. Subsequently, the cross-correlation algorithm is applied, used to measure the displacement in pixels between the two ROIs. To that end, the following property of the Fourier transform is used:

$$T_f(I_{ROI1} * I_{ROI2}) = T_f(I_{ROI1})T(I_{ROI2})$$

wherein $T_f$ denotes the Fourier transform, $I_{ROI1}$ and $I_{ROI2}$ are ROIs 1 and 2 respectively and * denotes the cross-correlation operator. If the Flourier anti-transform is applied to both sides if the preceding equation, one obtains:

$$I_{ROI1} * I_{ROI2} = T_f^{-1}(T_f(I_{ROI1})T(I_{ROI2}))$$

wherein $T_f^{-1}$ denotes the inverse Fourier transform. In this manner, a definition for the cross-correlation is obtained by applying the Fourier transform to the images and then applying the inverse transform. This allows reducing calculation times, since these operations can be parallelized using a GPU. In this case, the library NVIDIA CUDA cuFFT was used in Jetson Nano plates (Developer Kit B-1, 128-core GPU) and Jetson Xavier Nx (384-coreGPU).

Figure 6:
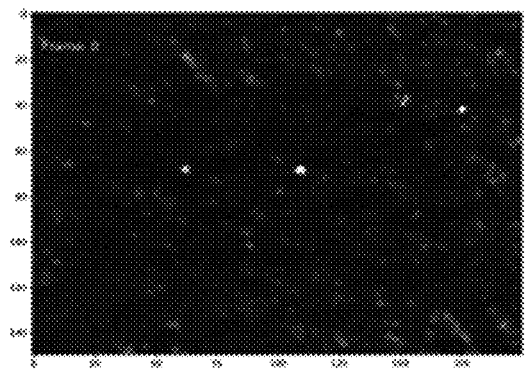
FIG. 6 shows the same region of interest (ROI) of two different frames separated by 1 s during a measurement in the discharge ramp of a sample of mud and cuttings.
Figure 6:
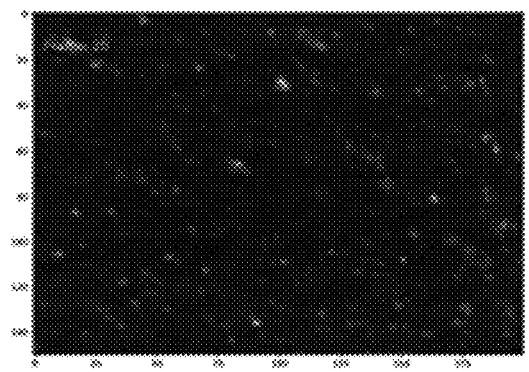
Figure 6:
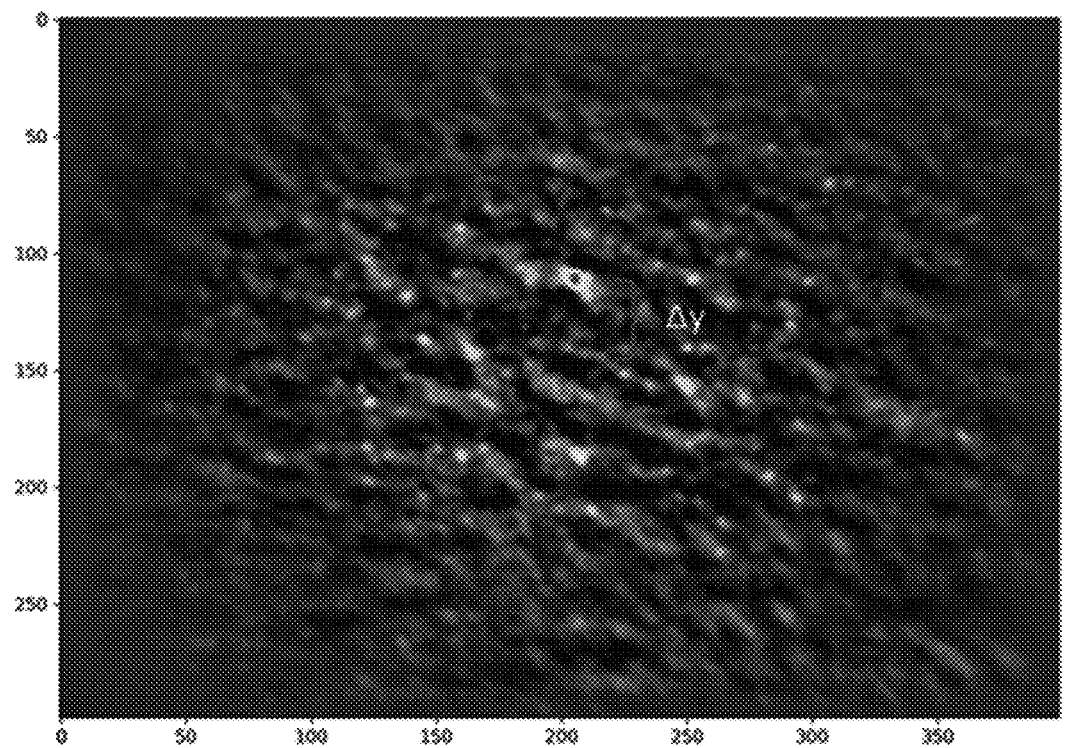

In FIG. 6, the same region of interest (ROI) of two frames is shown, taken with a difference of 1 s.

Figure 7:
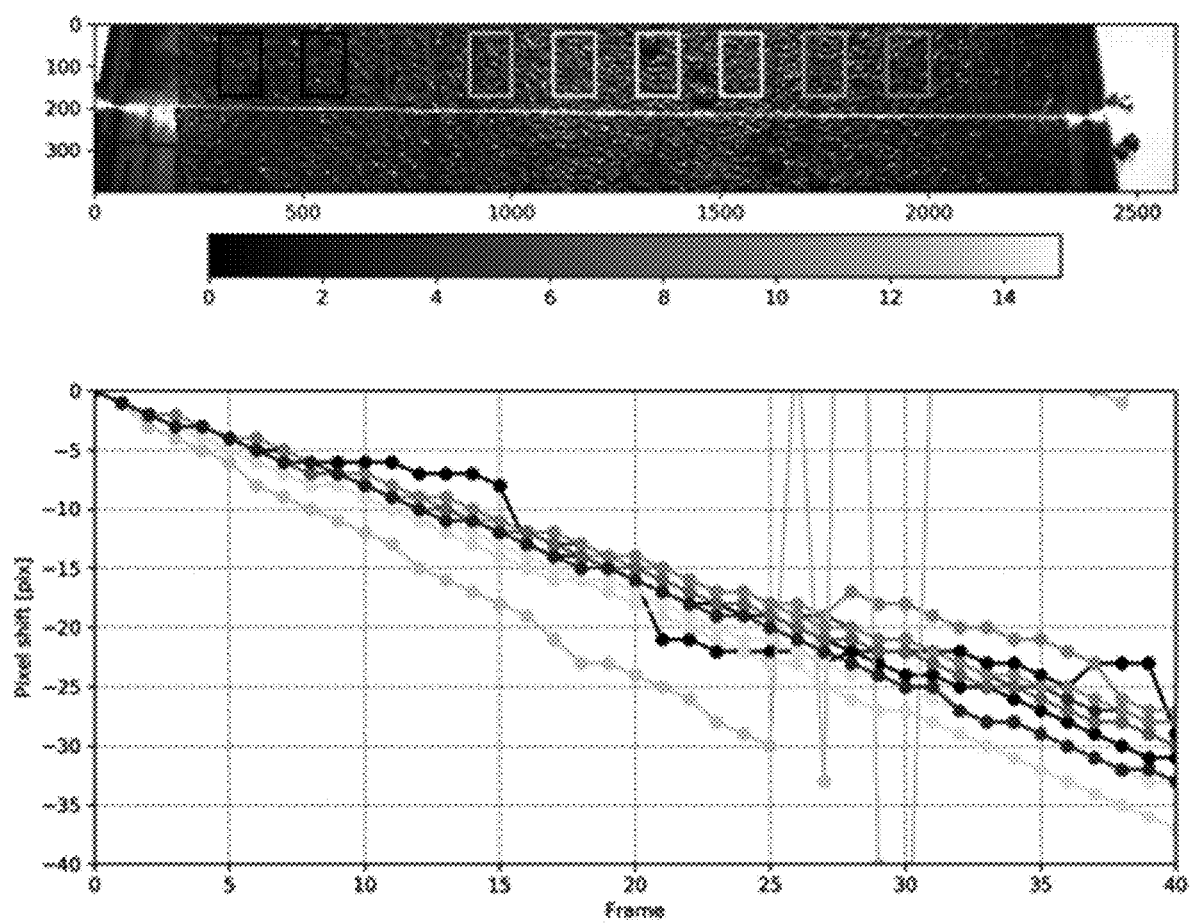
FIG. 7 shows the applied method for velocity measurement for different ROIs of the image.

By calibrating the camera pixels, a measurement of distance and subsequently a measurement of velocity is obtained. To reduce the error and enhance measurement accuracy, the algorithm is repeated for consecutive frames and for different regions of the image. Once the displacement in pixels as a function of the frame is obtained, a linear fitting of the displacement curves is carried out for all regions and times, thereby obtaining a velocity map. The precision of the method is improved by considering the linear fit of the displacement curves using a least-squares method. FIG. 7 shows the obtained displacement for different regions of the image with cuttings being thrown over the ramp. The slope of the curve determines the falling velocity of the sample.

The device and method provided by the invention were tested, both at the laboratory scale as in a drilling field operation, as will be discussed in the non-limiting examples below.

EXAMPLES

Fort the laboratory scale tests, a testing bench was built so as to reproduce the field conditions, using a ramp having similar dimensions to those of a ramp in a field operation, and using mud and cutting samples obtained from a field operation. A weighing scale was built and placed at the discharge of the ramp, in order to monitor the mass flow rate, to compare this value with the volumetric flow rate obtained by using the scanner in the system and method provided by the invention.

After the tests at laboratory scale, a field test was carried out during a drilling or perforation operation, also using commercial equipment for measuring the cutting mass flow rate. For this field test, the system was configured for measurements in the ambient lightning and vibration conditions encountered in the field. The resulting equipment, implementing the system and method provided by the invention, is advantageously small and compact and easy to handle. Furthermore, it meets the security standards required by the drilling company, since the area where the device is to be installed corresponds to a Zone 1 hazardous area as defined by ATEX (European Directives 99/92/EC and 2014/34/EU).

The tests will be presented in further detail below. While these tests are related to and illustrate embodiments of the system and the method provided in the present invention, they are not meant to limit the scope of the disclosure in any form or manner.

Laboratory Tests

Figure 8:
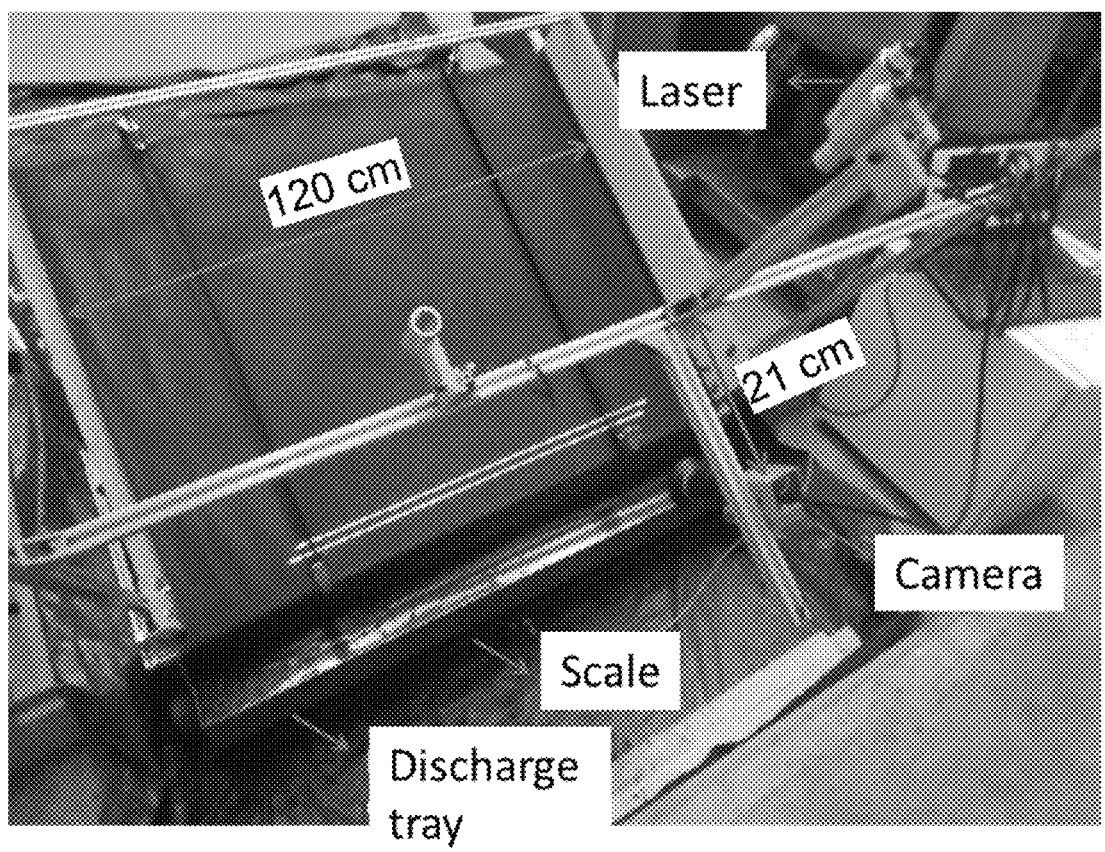
FIG. 8 shows an experimental setup for carrying out the method provided by the invention.

An experimental setup was built to test the system and method provided by the invention with drilling mud and cutting samples. The setup is shown in FIG. 8 and consists of a slanted metal surface mounted in an aluminum frame allowing to modify the fall angle of the cuttings and the positions of the laser and the 3D camera. In order to validate flow rate measurements, a weighing scale or validation scale was provided in the discharge tray into which cuttings are discharged, in order to measure the accumulated weight in real time.

Figure 9:
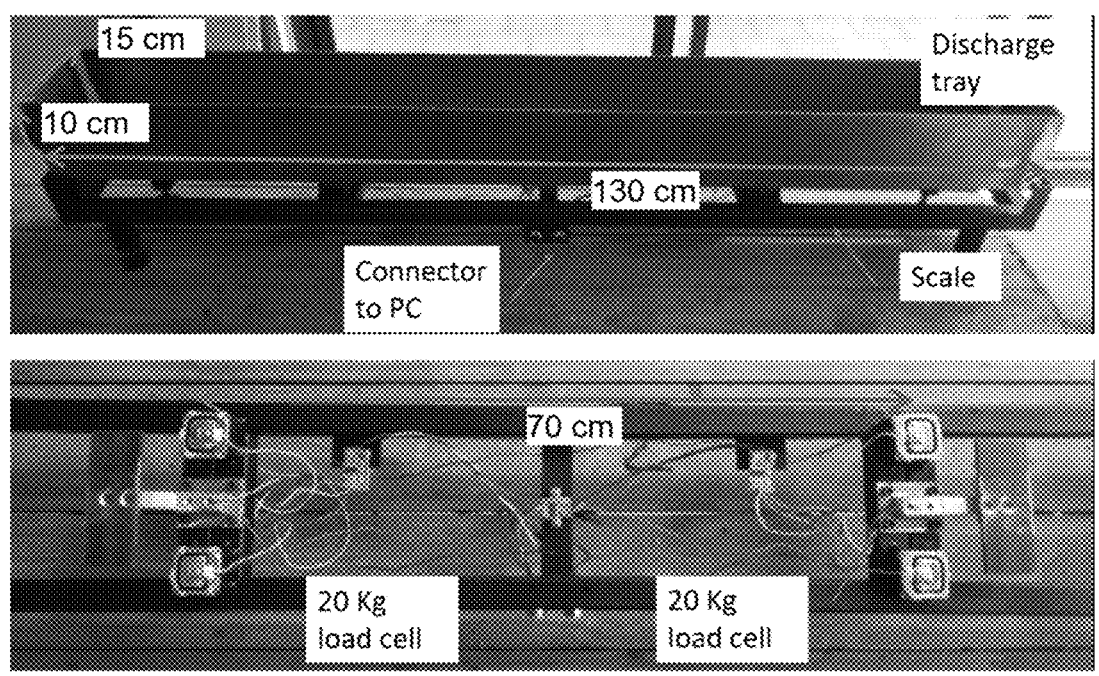
FIG. 9 shows the scale constructed for the measurement of the mass flow rate, in which the discharge tray rests on two load cells.

FIG. 9 shows a detail of the weighing scale and the load cells supporting the discharge tray. The load cells can measure up to 20 kg of force and their resolution is approximately 10 g. The data acquired by the sensors is transmitted to and stored in the PC.

The components used for the tests are shown in FIG. 8. The camera is a Basler acA2500-60 μm with 5MP and a 1" sensor, the typical acquisition frequency is from 20 Hz to 25 Hz. The lens is a Moritex ML-U0817SR-18C which is compatible with the chosen sensor and has a vision angle of about 60 degrees. The line generating laser from BerlinLaser has an aperture of 60 degrees and is of the diode type, it emits at 635 nm and has a power of 100 mW. The distance from the laser to the discharge ramp is 90 cm and the horizontal vision field is of about 1.20 m. The angle between the laser, more precisely the axis of the laser, and the camera, more precisely the axis of the camera lens, is of about 14 degrees.

Even if FIG. 8 shows two lasers, the profile was obtained using only one of the lines, and it was found that the use of two lasers simultaneously did not result in any improvement for the application of the algorithms. The camera, having a USB 3.0 interface, was connected to a PC, which was used for data acquisition and for sorting the raw data, to which the subsequent processing is carried out.

For the tests, a sample comprising oil-based mud and cuttings was poured into the discharge ramp, as well as several objects simulating a landslide (cavings). To these ends, a pouring tray was used to pour the tray from the top portion of the ramp. The sample is then accumulated in the lower part of the ramp on a discharge tray supported by a weighing scale, which allows measuring the mass flow rate in real time.

Flow Rate Measurement

In order to measure flow rate, different algorithms were applied to detect the laser line in consecutive frames obtained by the camera. In this manner, it is possible to obtain a profile map where the color indicates the height of the cuttings front and wherein each row corresponds to the profile obtained in a video frame.

Figure 10:
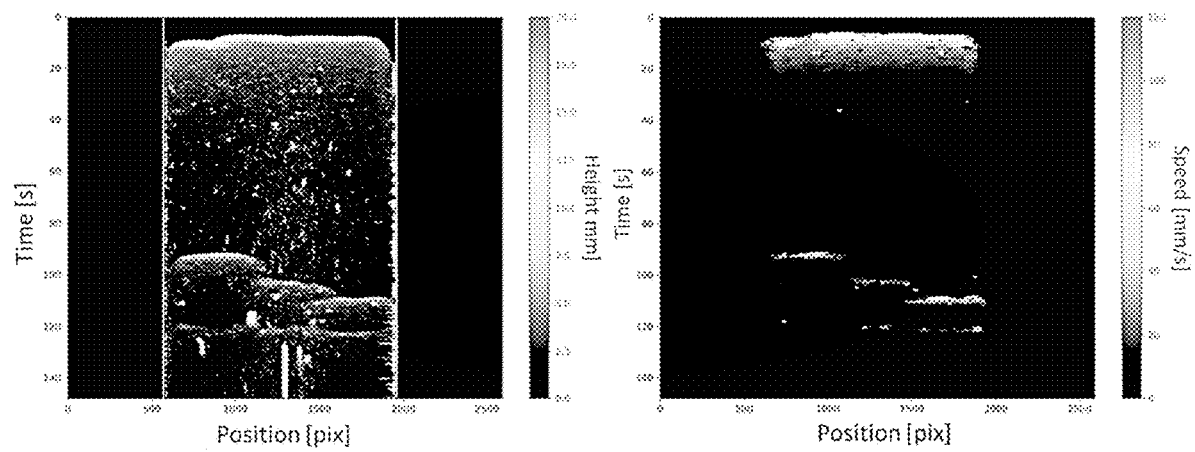
FIG. 10 shows images of profiles (left) and speed (right) observed with the system and method provided by the invention.

FIG. 10 shows images of profiles and velocity obtained with the experimental setup, where it is observed that the cutting front has greater height and falls with greater velocity.

Figure 11:
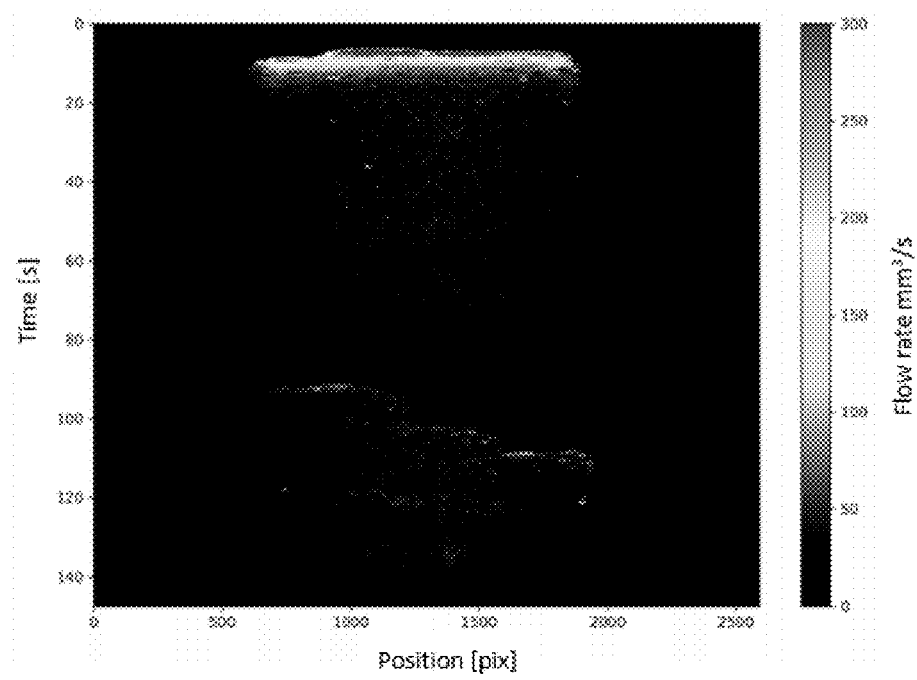
FIG. 11 shows the flow rate obtained from the product of the profile and speed.

By combining the measurements, a flow rate map is obtained as a function of time, as shown in FIG. 11. By integrating the flow rate in the surface width, a cutting volumetric flow rate curve can be estimated.

Figure 12:
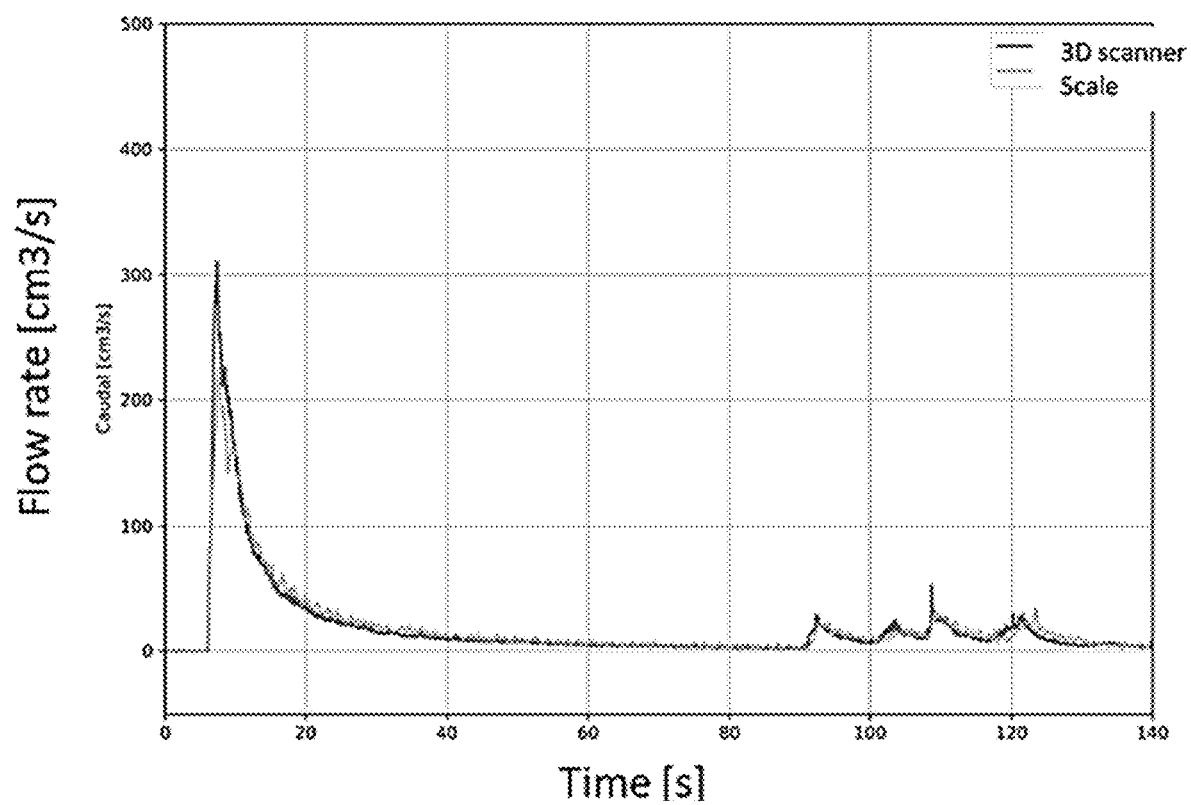
FIG. 12 shows experimental flow rate curves obtained using a 3D optical scanner in the method provided by the invention (blue) and the validation scale (orange).

By using the validation scale and considering a mean density of the mud and cutting mixture, it is possible to obtain a comparison between both measurements, as seen in FIG. 12. In this Figure, the similarity between the curves obtained by the 3D scanner (in blue) and with the scale (in orange) has an accumulated volumetric error of less than 5%. The system showed increased sensitivity to sudden changes in flow rate, such as those observed in the beginning or the ending of the measurement.

Detection of Objects

Detection and classification of cavings can be carried out by detecting the shape thereof. This shape can also provide information related to the origin of the cavings and the geomechanical instability that may cause cavings to form from the well wall. By knowing the shape, early action can be taken by modifying the density and rheological properties of the drilling mud, in order to minimize the instabilities generated at the well wall. Typically, cavings are classified according to their shape into angular, splinter, blocky and tabular cavings.

In order to evaluate the system potential for detecting cavings in real time, solid objects of known dimensions were incorporated into the drilling mud.

It was found that, since the system and method provided by the invention results in images having an enhanced contrast with respect to images obtained with systems and methods of the prior art, the detection of cavings can be advantageously improved.

Figure 13:
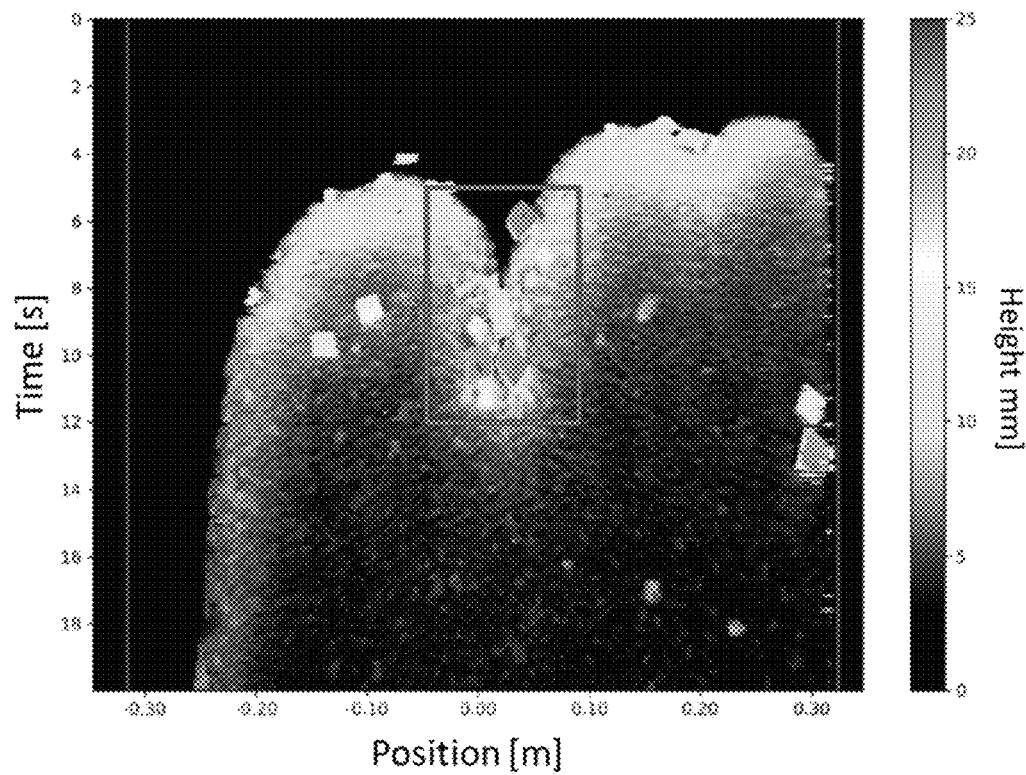
FIG. 13 shows a cutting profile image obtained with the system and method provided by the invention.

FIG. 13 shows a magnified view of the cutting front from one of the experiments, wherein solid objects of different sizes can easily be observed.

Figure 14:
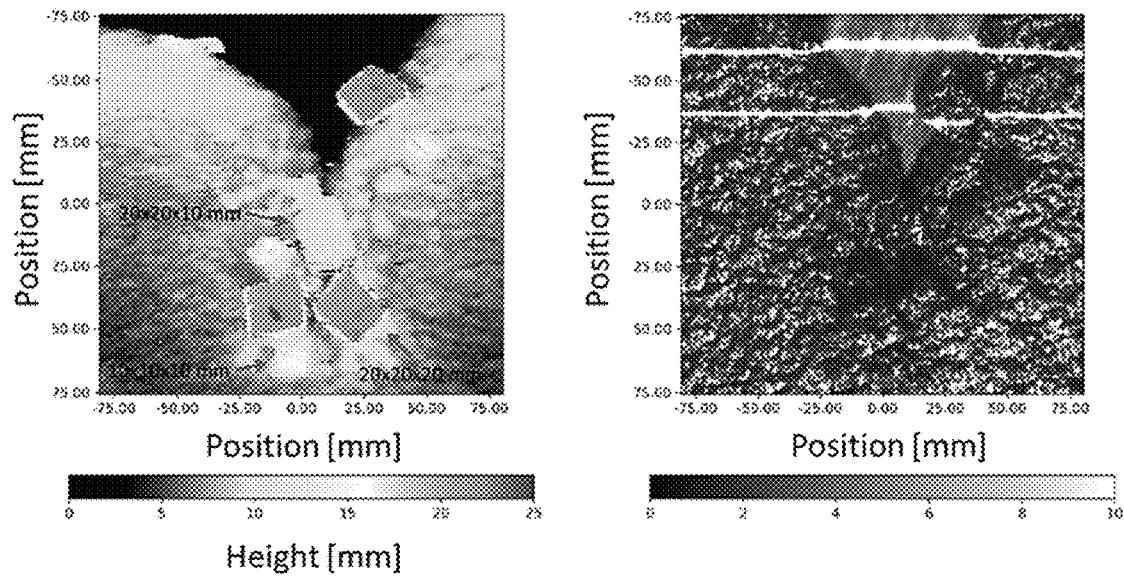
FIG. 14 shows a comparison between a profile image obtained with the system and method provided by the invention (left) and a corresponding optical image (right).

FIG. 14 shows a comparison between profiles obtained using profilometry on the left-hand side and the corresponding optical image on the right-hand side. It can be observed that, in the image reconstructed from profiles, the objects are clearly distinguishable from the background and it is possible to recover not only the shape, but also the height thereof. On the contrary, in the optical image, objects are barely detectable due to the lack of contrast that the mixture creates in the image.

Figure 15:
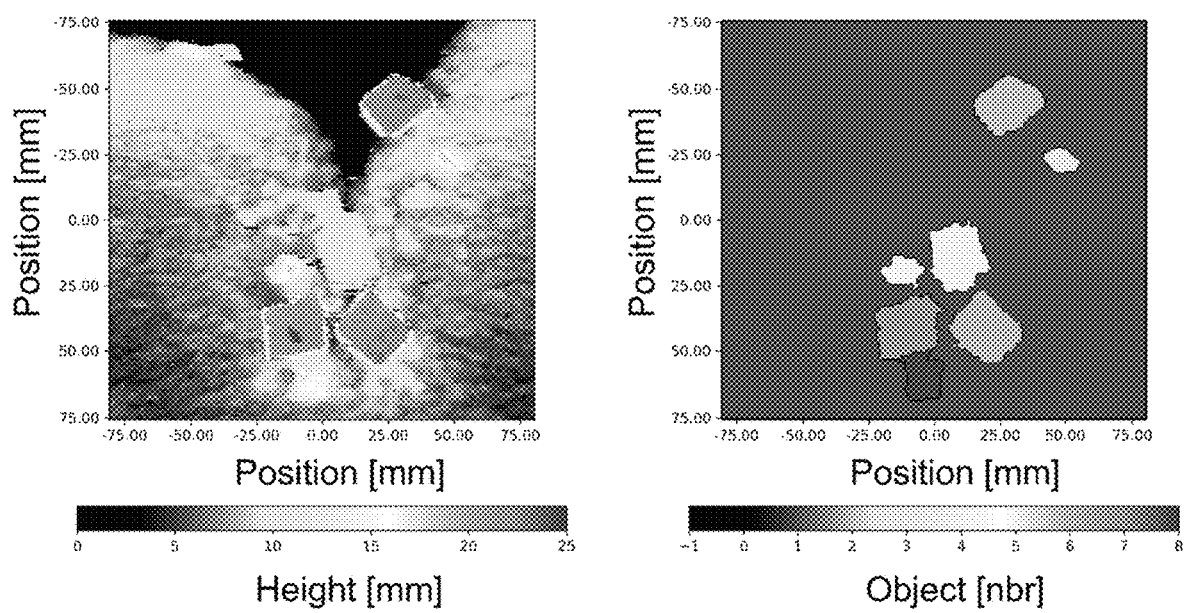
FIG. 15 shows a segmentation of the 3D image of FIG. 14.

FIG. 15 shows a segmentation of the 3D image of FIG. 14 using the Watershed Algorithm available in Open CV. The algorithm parameters were optimized for this measurement. In the segmented image, each object is represented as a distinct number, which is assigned a different color in the image. As can be seen, objects having a size greater than 10 mm×10 mm×10 mm can be detected by means of the good contrast observed between the objects and the background comprising cuttings in the 3D image.

Field Tests

Field Prototype

Figure 16:
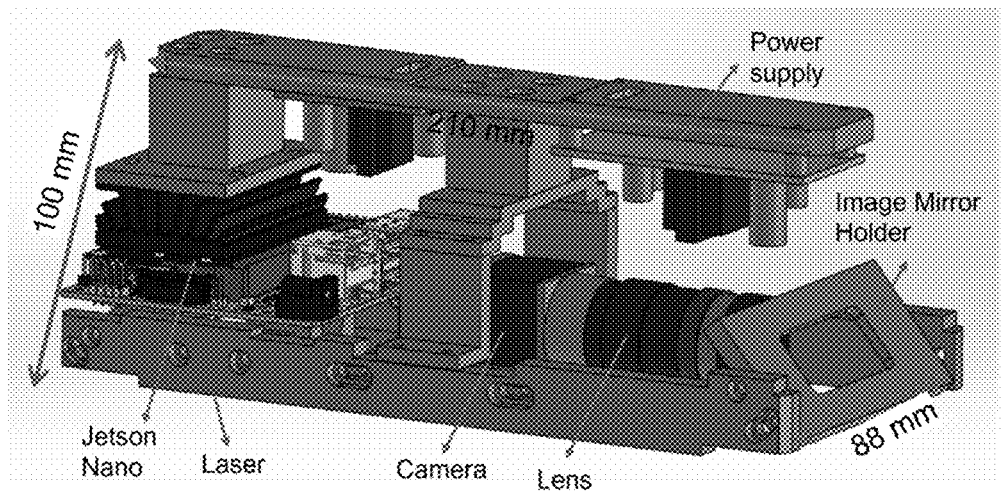
FIG. 16 shows a schematic representation of the prototype designed for field use, which is compact and can be housed in a cabinet suitable for a classified area (e.g. ATEX Zone 1).
Figure 17:
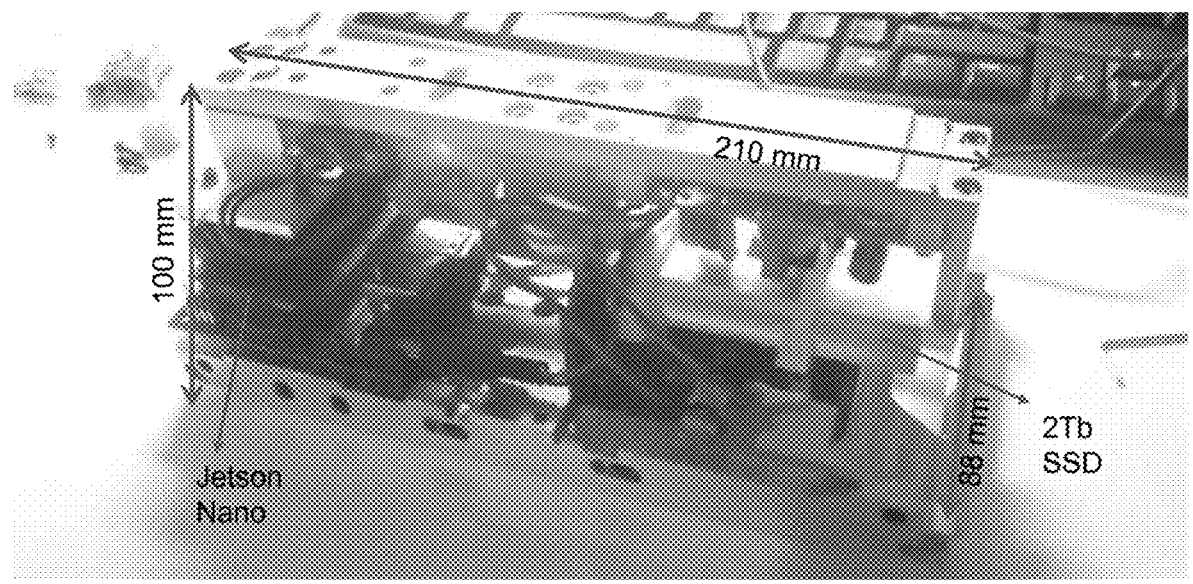
FIG. 17 shows the assembled field prototype mounted on an aluminum structure.
Figure 18:
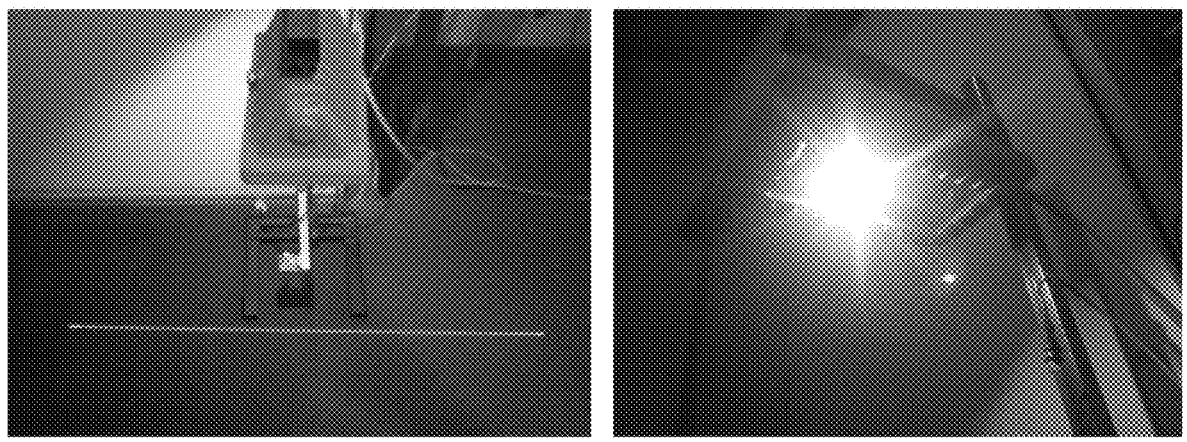
FIG. 18 shows the system in operation, the laser and the flashlight used to control the lighting levels can be observed.

FIG. 16 shows the prototype designed for a field operation, which was placed inside a casing suitable for ATEX Zone 1. The prototype comprises the system provided by the invention using a Basler camera acA2440-35 μm with a ¾" sensor, a focusing lens Moritex ML-M0625UR having a focal distance of 6 mm, a CNI laser generator, PGL-LF-635-100 mW and an embedded Jetson Nano unit was used for acquiring the images and storing them in a 2 Tb solid state drive. First surface mirrors were used to align the laser and the camera image, an optical band-pass filter MidOpt BP635-25.4 centered in the laser wavelength was used to filter out spurious light. Acquisition was carried out at 25 fps prioritizing the mean region of the image, i.e. 400×2440 pixels, in order to decrease the size of the images and increase the total acquisition time. The system is powered by electrical current at 220 V and uses sources at 5 V and 12 V to power the Jetson Nano, camera, laser and flash. Electronics are further provided for controlling the intensity levels of the laser and flash, which operate in pulsating mode and synchronized with the camera, to increase the lifespan of the components and reduce heat dissipation losses. The design optimizes heat dissipation of all the components with the casing, mainly the acquisition unit, which is carried out passively. To this end, the assembled field prototype is mounted on an aluminum structure to favor the dissipation of heat from the components. In turn, the structure is in contact with the cabinet to favor the dissipation of heat to the outside. FIG. 17 shows the design in which the system is placed into an explosion-resistant casing EXPC3, as seen in FIG. 18.

Field Setup

Figure 19:
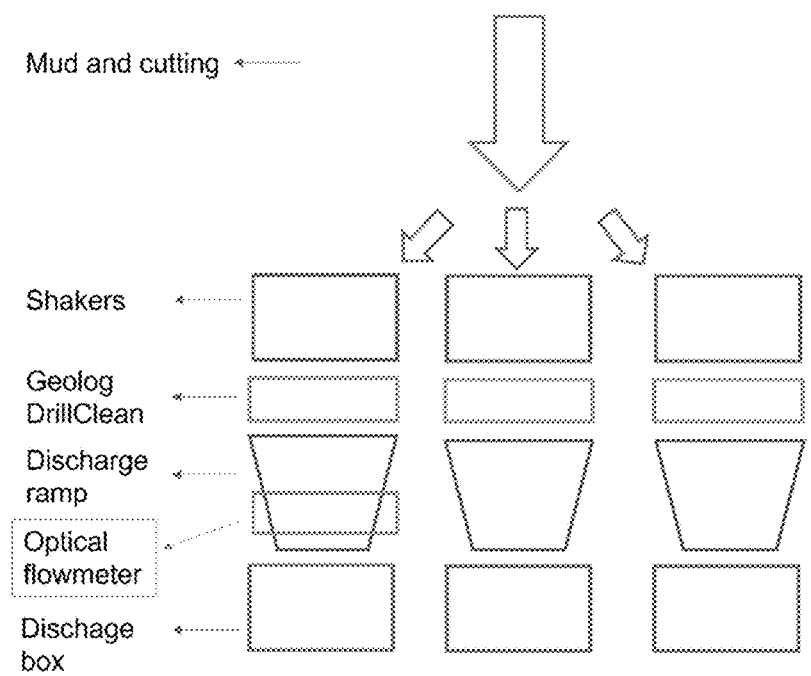
FIG. 19 shows the cuttings discharge scheme, with the shakers, the cutting weighing scales, the discharge ramps and the optical flowmeter on the first ramp.

The prototype was used in perforation equipment Nabors F03 during drilling of well LLL-1610 in the province of Neuquén, Argentina. A mass flow meter was used in order to compare the obtained measurements with the results provided by the system and method provided by the invention. In the perforation equipment, the discharge for mud and cuttings is distributed between three shakers, which separate the solid phase from the liquid phase. The liquid phase is reintroduced into the perforation circuit, while the solid phase comprising cuttings is poured into containers for subsequent treatment. In this case, at the end of each shaker, weighing scales were provided in order to weigh and pour the contents into the discharge ramp and accumulate them in a dump truck, as illustrated in FIG. 19.

Figure 20:
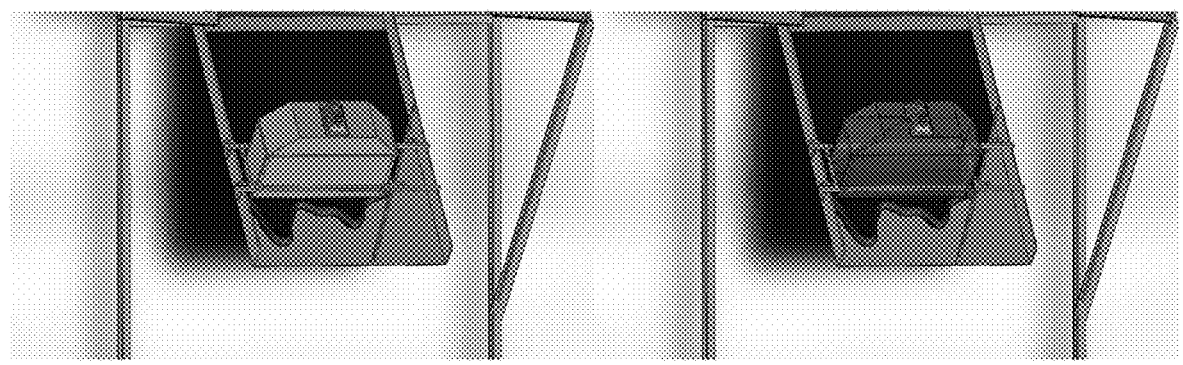
FIG. 20 shows the flowmeter assembly for the field test.
Figure 21:
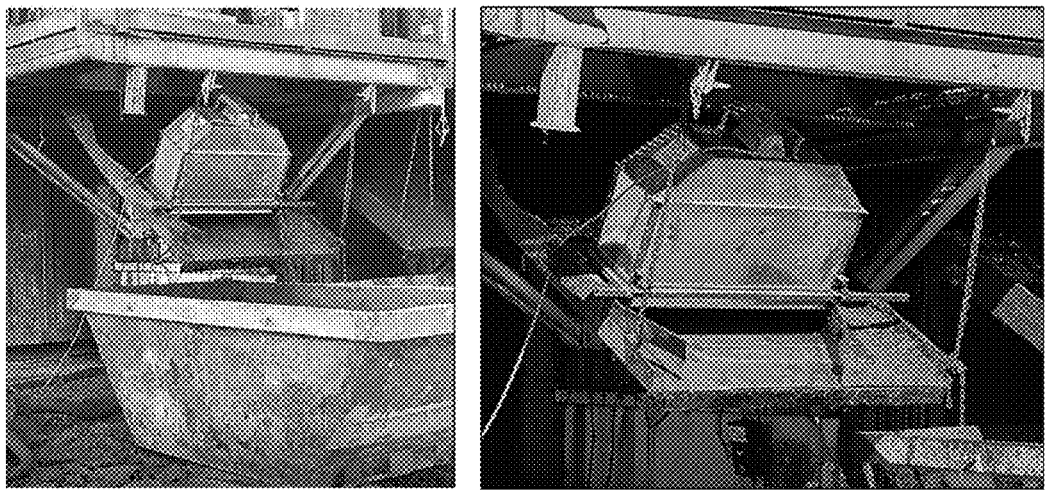
FIG. 21 shows the flow meter mounted on the first discharge tray.

The cutting flow meter was installed in the first of such discharge ramps having a width of approximately 110 cm and side walls of 25 cm in height, as illustrated in FIG. 20 and shown in FIG. 21. A dome or hood was used for assembling the cuttings flow meter in the discharge ramp, by attaching it to the side wall of the discharge ramp. Besides providing support, it allows darkening the instrument measurement areas, thereby increasing the efficiency in the laser line detection and controlling the levels of ambient light using only the flashlight provided in the system.

Surprisingly, it was found that by placing the cuttings flow meter, specifically the camera, in the discharge ramp and after the shakers, as opposed to on the shakers, the sensitivity of the measurements can be increased.

Without wishing to be bound by theory, this may be due to the fact that the camera, being an optical instrument, is not affected by the vibrations produced by the shakers in the system provided by the invention. The sample falls due to the effect of gravity and the slope of the ramp, not because of the shaker movement.

In addition, since the discharge ramp is uncoupled from the shaker and from the plane containing the shaker, the vibrations to which the discharge ramp and the attached cuttings flow meter are subjected is minimal.

Given that the cuttings are not subjected to vibrations, they can be detected by the camera with lower levels of movement noise, i.e. blurring. Even if the cutting moves as it is falling on the ramp, this movement is at a lower speed than the vibrations of the shaker, and the resulting noise levels are negligible.

Further, since the cuttings flow meter does not vibrate, it is less susceptible to mechanical malfunctioning by unfastening of screws, bolts, etc. The camera and the laser are not subjected to vibrations that may misalign the optical components lens and sensor.

Since the cuttings flow meter is not coupled to the shaker, it does not interfere with the operation thereof. This simplifies its installation and allows the shaker to be maintained for reparations, calibration, etc.

Finally, since the cutting is not vibrating, the flow meter is not prone to splashing from the mud and does not require frequent cleaning.

Data was gathered during 20 h of drilling, which was recorded in a hard drive placed inside the casing. These measurements were carried out during hours of both the day and the night, and it was verified that the system is able to measure acceptable signal levels in various external lighting conditions. Once the measurement was complete, the system was disassembled, and the data was analyzed.

Results

Figure 22:
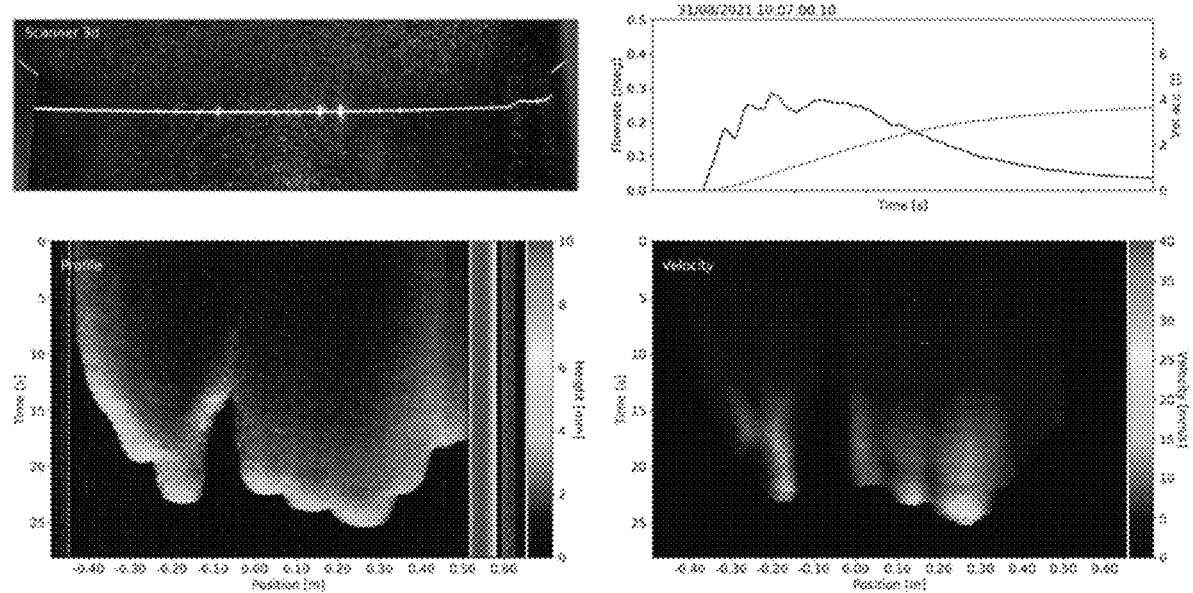
FIG. 22 shows an image acquired by the camera wherein the laser line can be seen, the detection of which allows the height profile of the fluid to be obtained. The waterfall of velocities obtained using a correlation algorithm and the measurement of flow and accumulated volume for a discharge of the balance are also shown.

FIG. 22 shows a typical image as acquired by the camera, in which the laser line can clearly be observed. It was verified that the vibration and dirt levels did not affect the quality of the measurements, nor did the exterior ambient light, which was efficiently filtered by the hood and the optical filter. The light levels could be effectively controlled by the flashlight, which allowed obtaining an accurate measurement of the velocity, both during the day and during the night. FIG. 22 further shows waterfall graphs with a false coloring scale, which indicate the height and the velocity of the fluid flowing along the discharge ramp. At the top right corner, the accumulated cutting volume (in red) and the flow rate (in blue) can be observed. A peak corresponding the one of the discharges of the weighing scale is shown in the graph.

Figure 23:
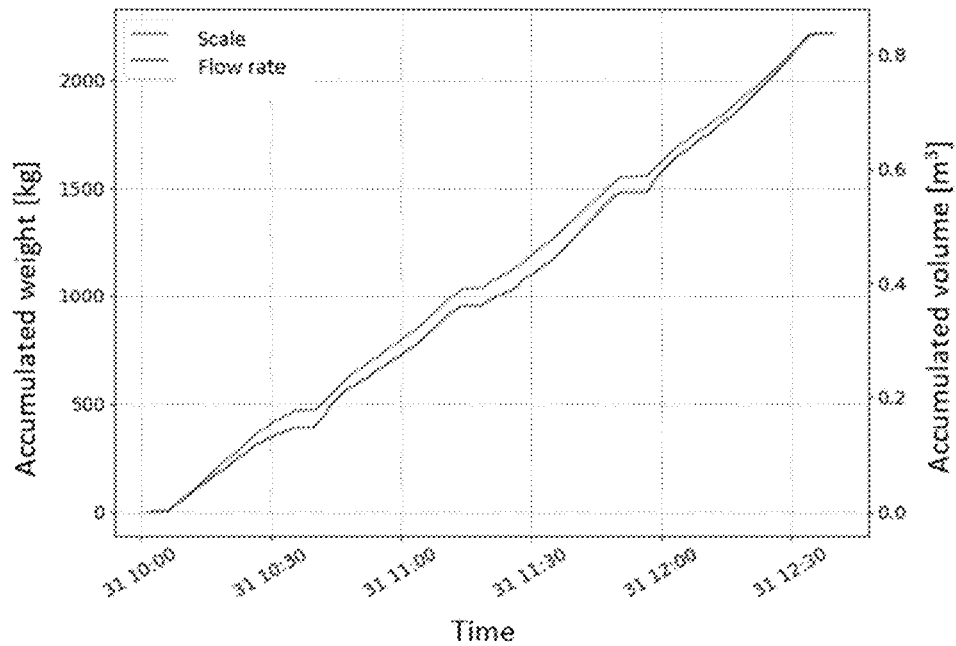
FIG. 23 shows the accumulated volume and accumulated weight curves obtained with the optical and scale systems, respectively.

FIG. 23 shows the accumulated volume measured by the cuttings flow meter as a function of time, along with the accumulated weight measured with the weighing scale system. A good correlation is observed between the measurements in the face of changes in the flow trend. It can be seen that both curves follow the same trend and the variations in the slopes observed with the weighing scale system have their correspondence in the obtained measurements with the scanner. The five interruptions observed along the measurements correspond to the stopping of perforation, in which a piece is added to the drilling rod.

Figure 24:
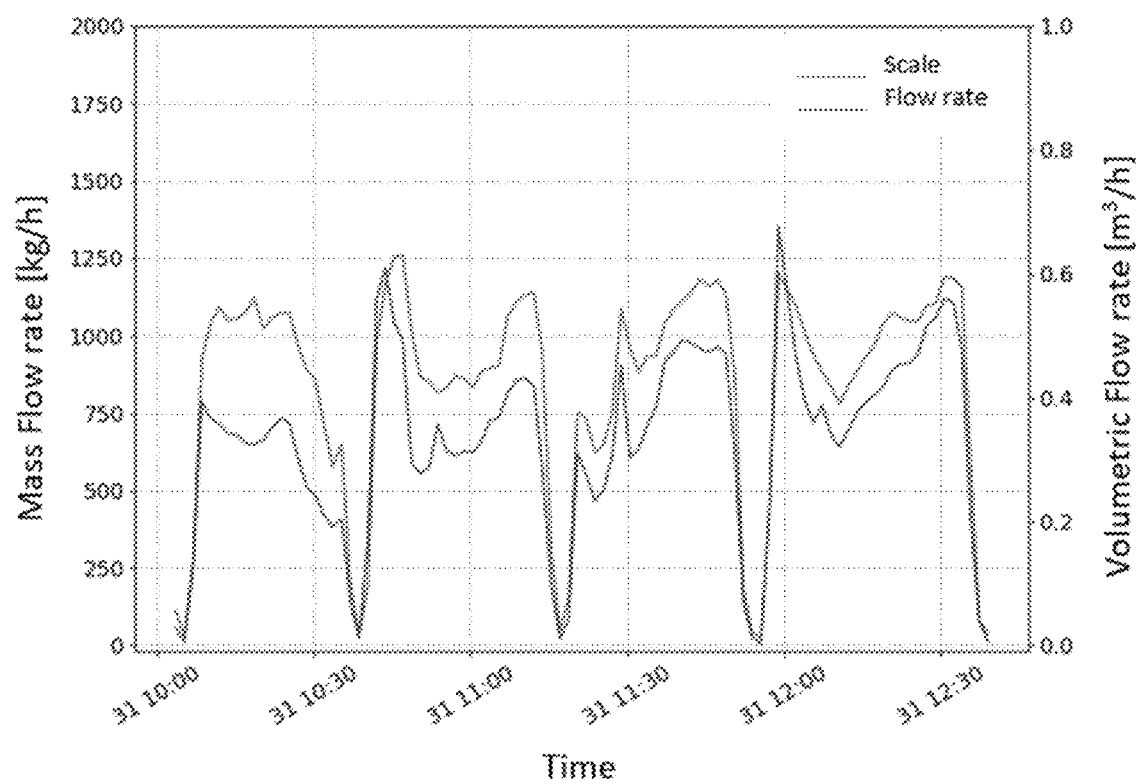
FIG. 24 shows the volumetric and mass flow curves obtained from the data of graph in FIG. 23.

FIG. 24 shows the volumetric and mass flow rates obtained by calculating the derivatives (slopes) of the preceding graph, an excellent correlation between both curves can be observed. In this case, the derivative is calculated at long times (in the order of minutes) to discount the effect of the discharge of the scales, which occur in short times (seconds). This is because at shorter times, the flow rate variations due to the weighing scale are predominant, and these should be filtered.

From the ratio of the flow rate curves, a mean density value is obtained, varying between 2.0 y 2.5 kg/dm$^3$ and corresponding to normal operation levels. These results confirm the technical viability of the system and method for their use in actual operation conditions.

Figure 25:
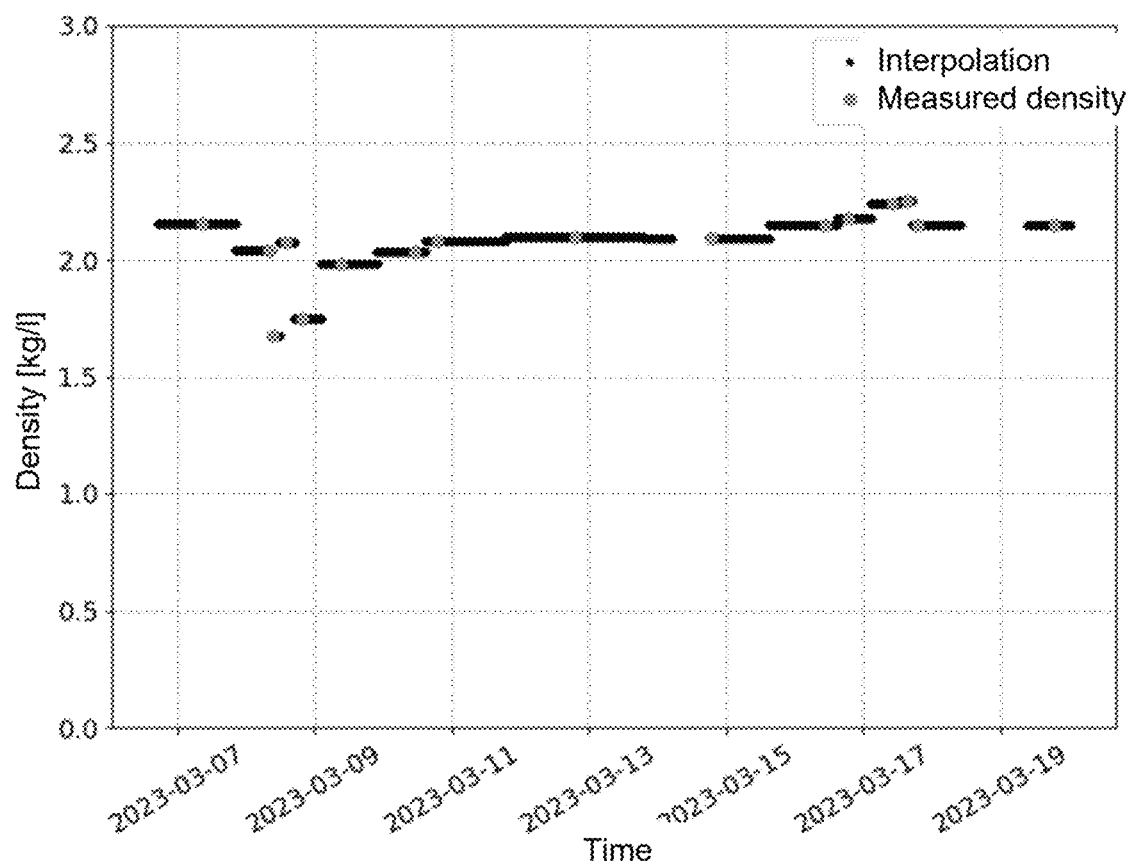
FIG. 25 shows the measured density as a function of time during a field test.

A second field test was carried out in order to validate the measurement system provided by the invention during the drilling of a well, for one week. To that end, density measurements were carried out, at a frequency of two measurements per day. The density measurements were used to convert the volumetric flow rate measured by the system into a mass flow rate, as shown in FIG. 25. The interpolation of the measured data can be used to determine the density at any given instant of the flow rate measurements.

Figure 26:
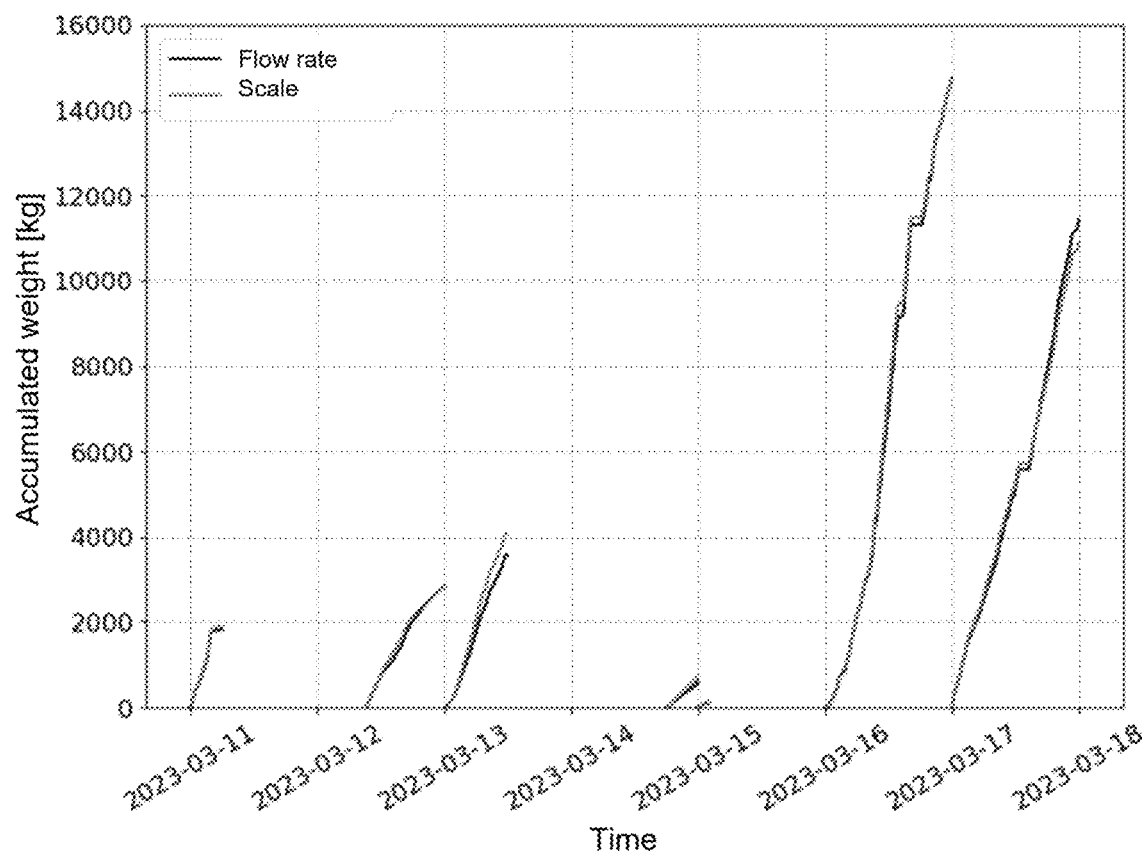
FIG. 26 shows the accumulated weights as a function of time during a field test, obtained by the measurement system of the present invention and as measured by the scale.

In this manner, it is possible to compare the accumulated weight as measured by the scale to the one obtained through the mass flow rate estimated with the density measurements and the measurement system provided by the present invention. FIG. 26 shows a graph comparing both measurements (i.e. accumulated weight estimated using the system provided by the invention and accumulated weight measured using the scale).

In FIG. 26, it can be seen that a very god agreement between both measurements if obtained, and the difference between accumulated weights is at most 5% throughout the measurements, which validates the method provided by the present invention. This difference can be due to instrumental error or sample size.

A mathematical model for cutting wetting can be used to estimate the volume of dry cuttings, i.e. free from drilling mud. This estimation can be compared with a theoretical expected value, which depends on well dimensions, in order to estimate the cutting deficit of the well, as well as its degree of cleanliness.

The invention claimed is:

1. A system comprising:
   a surface for receiving solid objects,
   a laser line generator,
   a high-resolution camera arranged at an angle of about 10° to 20° with respect to the laser line generator,
   a data processing unit, wherein the data processing unit is configured for acquiring a laser line position data as a function of time from a plurality of photographs of the solid objects taken by the high-resolution camera and calculating a solid object size from the laser line position data as a function of time.

2. The system of claim 1, wherein the angle is of about 14°.

3. The system of claim 1, further comprising a hood for darkening a measurement area of the system.

4. The system of claim 3, further comprising a flashlight for controlling lighting levels.

5. The system of claim 4, further comprising an optical filter.

6. The system of claim 1, wherein the data processing unit is further configured for calculating a cuttings flow rate from the plurality of photographs of the solid objects taken by the high-resolution camera.

7. The system of claim 1, wherein the data processing unit is further configured for detecting cavings from the calculated solid object size.

8. The system of claim 1, wherein a system optical resolution is greater than the pixel size (dz), wherein $$dz = \frac{\text{pixel}_{pitch}}{M \sin(\alpha)}$$

wherein $\text{pixel}_{pitch}$ corresponds to the pixel size in the sensor, M is a high-resolution camera lens magnification and a is the angle with respect to the laser line generated by the laser line generator.

9. The system of claim 1, further comprising a shaker, wherein the solid surface forms a discharge surface for discharging solid objects into the shaker.

10. The system of claim 9, wherein the high-resolution camera is placed at the discharge surface.

11. The system of claim 10, wherein the discharge ramp is not coupled to the shaker.

12. A method for calculating a solid object flow rate from a mixture comprising an oil-based mud and solid objects, comprising:
   providing a surface for receiving solid objects, a laser line generator, a high-resolution camera arranged at an angle of about 10° to 20° with respect to the laser line generator and a data processing unit;
   letting the mixture flow over the surface;
   taking a plurality of photographs of the solid objects with the high-resolution camera;
   acquiring, by the data processing unit, a laser line position data as a function of time from a plurality of photographs of the solid objects taken by the high-resolution camera and calculating a solid object size from the laser line position data as a function of time; and
   calculating a cuttings flow rate from the plurality of photographs of the solid objects taken by the high-resolution camera.

13. A method for detecting cavings in an oil-drilling operation, comprising:
   providing a surface for receiving solid objects, a laser line generator, a high-resolution camera arranged at an angle of about 10° to 20° with respect to the laser line generated by the laser line generator and a data processing unit;
   letting a mixture comprising an oil-based mud and solid objects flow over the surface; and
   taking a plurality of photographs of the solid objects with the high-resolution camera;
   acquiring, by the data processing unit, a laser line position data as a function of time from a plurality of photographs of the solid objects taken by the high-resolution camera and calculating a solid object size from the laser line position data as a function of time; and
   determining a presence of cavings from the solid object size, wherein a caving is an object having a size of about 10 mm or more.

* * * * *